United States Patent
Tan et al.

(10) Patent No.: US 10,353,849 B2
(45) Date of Patent: Jul. 16, 2019

(54) SYSTEM AND METHOD FOR TRACKING PERIPHERAL PROXIMITY BY MULTIPLE MASTERS

(71) Applicant: Dell Products, LP, Round Rock, TX (US)

(72) Inventors: Danilo O. Tan, Austin, TX (US); Geroncio Tan, Austin, TX (US); Fernando L. Guerrero, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 182 days.

(21) Appl. No.: 14/631,001

(22) Filed: Feb. 25, 2015

(65) Prior Publication Data

US 2016/0246753 A1    Aug. 25, 2016

(51) Int. Cl.
   *G06F 13/42*   (2006.01)
   *G06F 13/40*   (2006.01)
   *G06F 13/364*  (2006.01)

(52) U.S. Cl.
   CPC ........ *G06F 13/4282* (2013.01); *G06F 13/364* (2013.01); *G06F 13/404* (2013.01)

(58) Field of Classification Search
   None
   See application file for complete search history.

(56) References Cited

U.S. PATENT DOCUMENTS

| 7,986,655 | B2 |   | 7/2011 | Joo |             |
|-----------|----|---|--------|-----|-------------|
| 9,113,287 | B2 | * | 8/2015 | Aldaz | ............ H04W 4/008 |
| 2005/0130656 | A1 | * | 6/2005 | Chen | ............ H04W 36/0055 455/436 |
| 2012/0083208 | A1 | * | 4/2012 | Giles | ............ G06F 13/387 455/41.2 |
| 2012/0238216 | A1 |   | 9/2012 | Hallowell et al. | |

OTHER PUBLICATIONS

"Everykey, The Wristband that Replaces Keys & Passwords, Launches on Kickstarter," Christopher Wentz, EveryKey, PRWeb, Cleveland OH, Oct. 29, 2014, pp. 1-2, http://www.prweb.com/releases/everykey/kickstarter/prweb12262874.htm.

"Everykey—No more Keys. No more Passwords," Everykey LLC—Kickstarter, Nov. 2014, pp. 1-16, https://www.kickstarter.com/projects/everykey/everykey-the-wristband-that-replaces-keys-and-pass.

* cited by examiner

*Primary Examiner* — Idriss N Alrobaye
*Assistant Examiner* — Dayton Lewis-Taylor
(74) *Attorney, Agent, or Firm* — Larson Newman, LLP

(57) ABSTRACT

A system includes a slave device, and first and second master devices. A chipset of the slave device is capable of communication with a specific number of master devices. The first master device is configured to connect the information handling system with the slave device, to receive a transmission power setting of the slave device while the first master device is connected to the slave device, to disconnect the from the slave device, and to continuously track a received signal strength indicator of the slave device while the first master is disconnected from the slave. The second master device configured to connect with the slave device in response to the first master device disconnecting from the slave device, wherein the connection to the second master causes the slave device to communicate with at least one more master device than the specific number of master devices.

19 Claims, 3 Drawing Sheets

SYSTEM AND METHOD FOR TRACKING PERIPHERAL PROXIMITY BY MULTIPLE MASTERS

FIELD OF THE DISCLOSURE

The present disclosure generally relates to systems and methods for tracking peripheral proximity by multiple masters.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

An information handling system, such as a personal computer, a cellular telephone, a tablet computer, or the like can utilize radio wave communication to detect the presence of another device. The communication between two devices can be through a Bluetooth low energy (BLE) communication, and can set up a master and slave relationship between the two devices.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
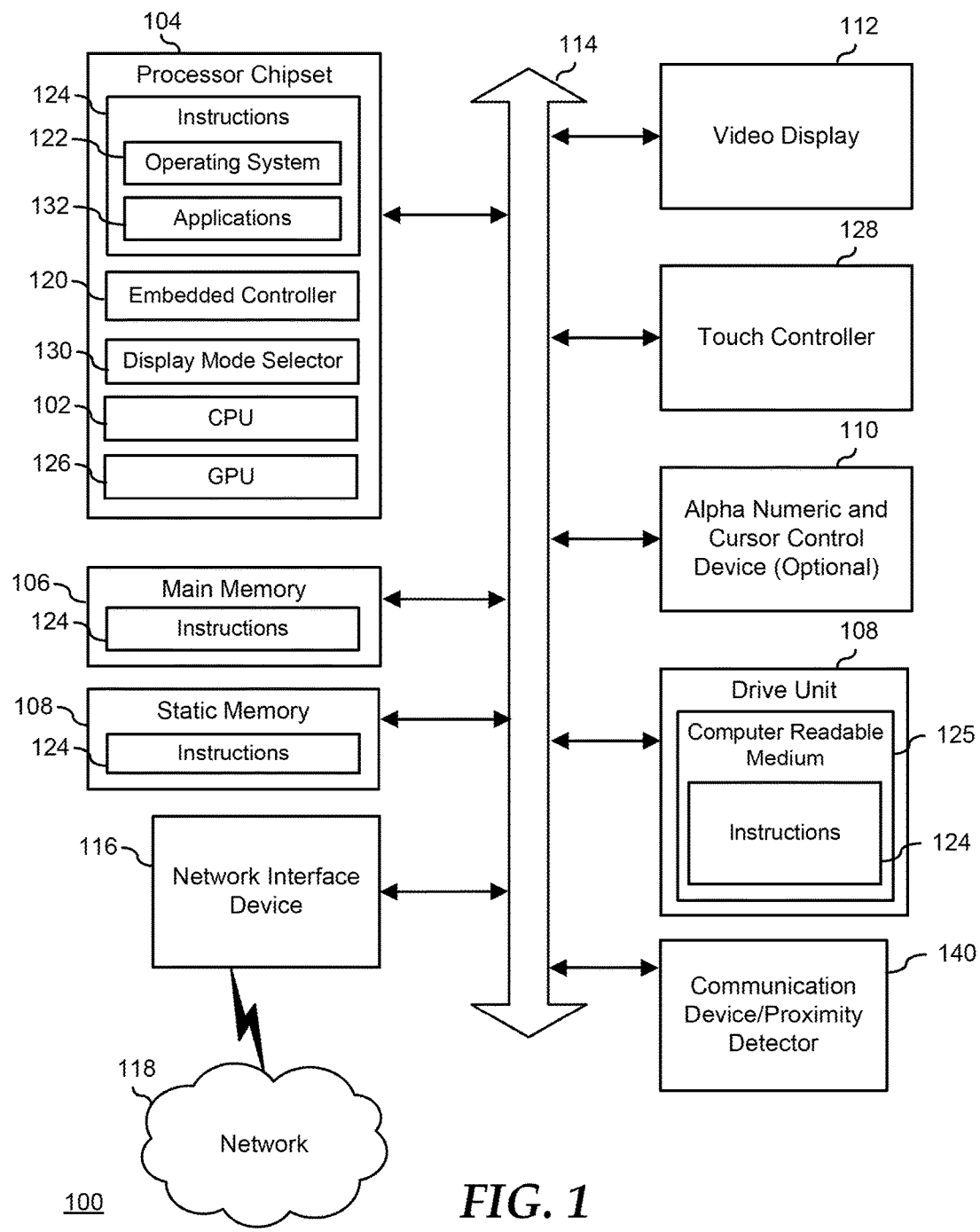
FIG. 1 is a block diagram of an information handling system according to at least one embodiment of the present disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer, such as desktop or laptop, tablet computer, mobile device (e.g., personal digital assistant (PDA) or smart phone), server (such as blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

In an embodiment, multiple information handling systems, such as a personal computer and tablet computer, can communicate with another information handling system, such as a wearable device, in a master/slave relationship according to at least one embodiment of the present disclosure. In an embodiment, the information handling systems may be configured to communicate via a wireless communication protocol, such as Bluetooth, Bluetooth low energy (BLE), or the like. The personal computer and the tablet computer can be configured as master devices, and the wearable device can be configured as a slave device. In an embodiment, the wearable device can be a slave to both the personal computer and the tablet computer, but the chipset of the wearable device can only connect to one of the personal computer or the tablet computer at the same time.

The wearable device can be placed within a threshold distance of the personal computer and the tablet computer. When the personal computer or tablet computer receives a user input or trigger, the chipset of the respective information handling system connects with the wearable device and requests authentication information from the wearable device. The chipset can then compare an authentication token received from the wearable device to one or more authentication tokens stored in a memory. If the authentication token from the wearable device matches one of the authentication tokens stored in memory, wearable device can be authenticated as a slave device of the personal computer or the tablet computer and can connect with the wearable device via a wireless communication link. The chipset can then retrieve the transmission power setting of the wearable device and can store the transmission power setting in the memory. The chipset can then disconnect from the wearable device, such that the personal computer or tablet computer and the wearable device are no longer actively communicating with one another.

After disconnecting from the wearable device, a proximity detector of the personal computer or the tablet computer can continually monitor a received signal strength indicator (RSSI) associated with the wearable device without being in active communication with the wearable device. The proximity detector can then continually calculate path loss of the signal strength for the wearable device based on the transmission power setting and a most recent RSSI of the wearable device. When the one of the master device disconnects from the wearable device, the wearable device can connect to any other master device. After the chipset for the next master device authenticates the wearable device, the chipset can disconnect from the wearable device and the proximity detector for that master device can continue to monitor a RSSI associated with the wearable device without being in active communication with the wearable device. Thus, after the initial communication and authentication of the wearable device, the proximity detectors of both the personal computer and the tablet computer can monitor the RSSI of the wearable device to determine whether the wearable device is still within proximity of the respective master device without being in active communication with the wearable device.

FIG. 1 shows an information handling system 100 including conventional information handling systems components of a type typically found in client/server computing environments. The information handling system 100 may include memory, one or more processing resources such as a central processing unit (CPU) 102 and related chipset(s) 104 or hardware or software control logic. Additional components of system 100 may include main memory 106, one or more storage devices such as static memory or disk drives 108, an optional external input device 110 such as a keyboard, and a cursor control device such as a mouse, or a video display 112. The information handling system 100 may also include one or more buses 114 operable to transmit communications between the various hardware components.

More specifically, system 100 represents a mobile user/client device, such as a dual screen mobile tablet computer. System 100 has a network interface device 116, such as for a wireless cellular or mobile networks (CDMA, TDMA, or the like), WIFI, WLAN, LAN, BTLE, or similar network connection, enabling a user to communicate via a wired or wireless communications network 118, such as the Internet. System 100 may be configured with conventional web browser software. The web browser, may include for example Microsoft Corporation's Internet Explorer web browser software, Firefox or similar such browsers to allow the user to interact with websites via the wireless communications network 118.

System 100 may include a several sets of instructions 124 to be run by CPU 102 and any embedded controllers 120 on system 100. The instructions 124 can be stored in a computer readable medium 125 of a drive unit 108. One such set of instructions includes an operating system 122 with operating system interface. Additional sets of instructions in the form of multiple software applications 124 may be run by system 100. These software applications 124 may enable multiple uses of the dual display information handling system as set forth in more detail below.

System 100 includes a display screen 112. The display screen 112 has a display driver operated by one or more graphics processing units (GPUs) 126 such as those that are part of the chipset 104. The display screen 112 also has an associated touch controller 128 to accept touch input on the touch interface of the display screen.

The display screen 112 may also be controlled by the embedded controller 120 of chipset 108. Each GPU 126 and display driver is responsible for rendering graphics such as software application windows and virtual tools such as virtual keyboards on the display 112. Control of the location and positioning of these windows may be set by user input to locate the screens or by control setting default. In several embodiments described herein, control of the location for rendering for software application windows and virtual tools in the display may be determined by an application window locator system as described further in the embodiments herein. The application window locator system determines operating state rank of running software applications and determines whether and where to display application display windows and virtual tools based on relative orientation and state of usage information. Windows may include other forms of display interface with software application besides a window. It is contemplated that tiles, thumbnails, and other visual application access and viewing methods via a display are contemplated to be considered windows. Virtual tools may include virtual keyboard, virtual touchpad or controller, virtual buttons and other input devices rendered via a display screen and accepting feedback via a touch control system.

In another example of display control via the disclosures herein, the power to the display screen 112 is controlled by an embedded controller 120 in the processor chipset(s) which manages a battery management unit (BMU) as part of a power management unit (PMU) in the BIOS/firmware of the main CPU processor chipset(s). These controls form a part of the power operating system. The PMU (and BMU) control power provision to the display screen and other components of the dual display information handling system.

A display mode selector 130, in connection with an application window locator system as described in more detail below, determines priority of concurrently running software applications and how to automatically locate software application display windows and virtual tools on the screen via the chipset 104 based upon orientation of the display screen 112 as well as the software applications 132 currently running and active and their status. Determining which applications 132 are running determines a working software application context. Alternatively, the application window locator may operate on an embedded controller 120 separate from the main CPU chipset(s) 104. Additionally, the power management application may receive state of usage activity input from device state sensors.

Figure 2:
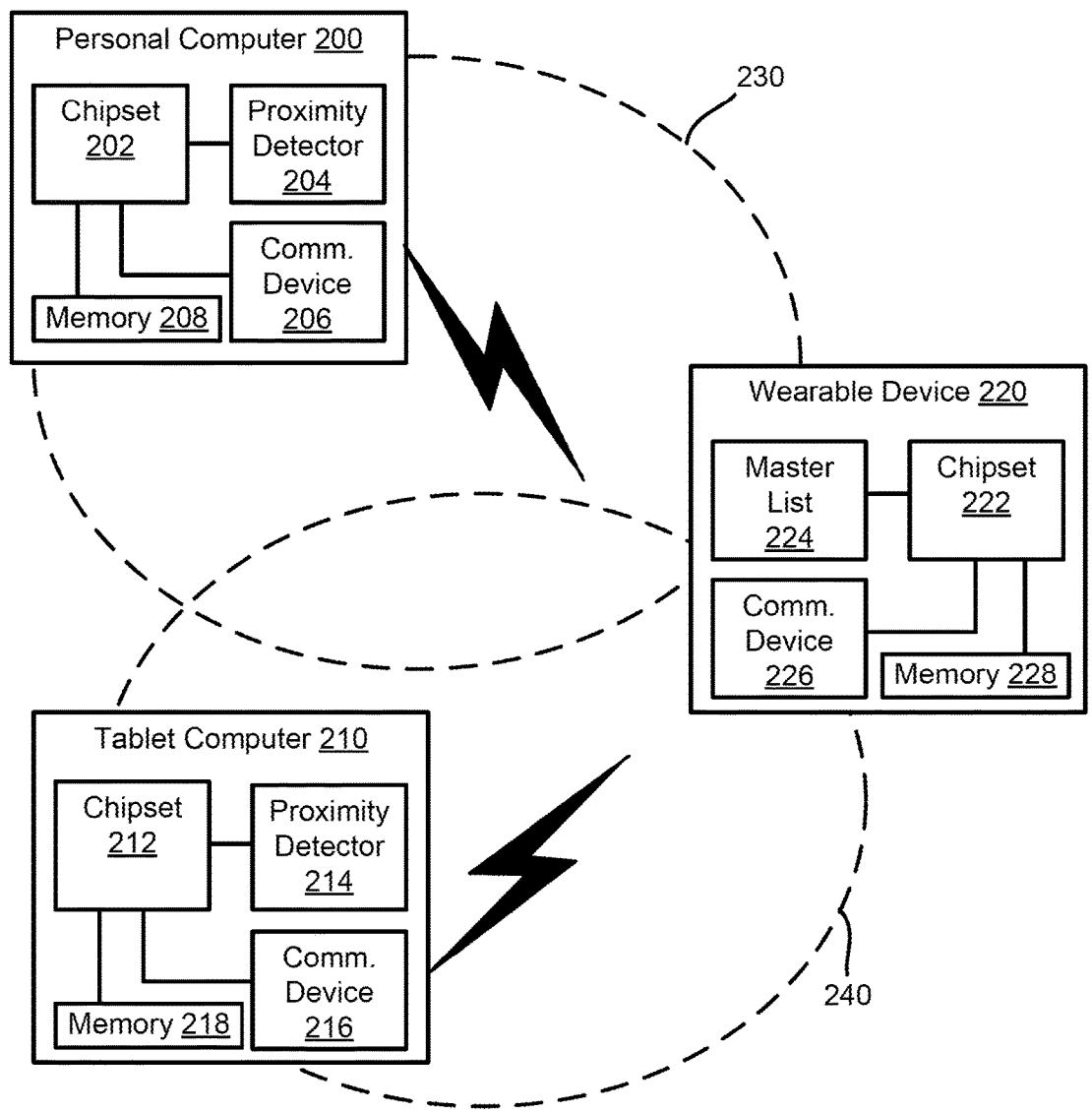
FIG. 2 is a block diagram of multiple information handling systems according to at least one embodiment of the present disclosure.

In an embodiment, the information handling system 100 includes a communication device/proximity detector 140 to track the proximity of a slave device to the information handling system 100. In an embodiment, the communication device/proximity detector 140 can be a single component within the information handling system 100, or can be separate components as shown in FIG. 2 below without changing the scope of the disclosure. In an embodiment, the proximity detector 140 can detect when a slave device is within a threshold distance, and can then provide a signal to the chipset 104 to initiate a connection between the information handling system 100 and the slave device. In an embodiment, proximity or the distance between the information handling system 100 and a slave device can be derived based on a transmit power from a communication device in the slave device and the received power received at the information handling system as discussed below with respect to FIG. 2.

After an initial connection has been made with the slave device, the chipset 104 can cause an action to be performed in the information handling system 100, such as the information handling system 100 can be unlocked. When the chipset 104 has unlocked the information handling system 100, the chipset 104 can cause the network interface device 116 to disconnect with the slave device, and can cause the proximity detector 140 to continue to track the distance the slave device is from the information handling system 100 as described in FIG. 2.

FIG. 2 shows multiple information handling systems, such as personal computer 200, tablet computer 210, and a wearable device 220, according to at least one embodiment of the present disclosure. The personal computer 200 includes a chipset 202, a proximity detector 204, a communication device 206, and a memory 208. In an embodiment, the proximity detector 204 and the communication device 206 can be combined in a single component without changing the scope of the disclosure. The chipset 202 of the personal computer 200 is in communication with the proximity detector 204, the communication device 206, and the memory 208. The tablet computer 210 includes a chipset 212, a proximity detector 214, a communication device 216, and a memory 218. In an embodiment, the proximity detector 214 and the communication device 216 can be combined in a single component without changing the scope of the disclosure. The chipset 212 of the tablet computer 210 is in communication with the proximity detector 214, the communication device 216, and the memory 218. The wearable device 220 includes a chipset 222, a proximity detector 224, a communication device 226, and a memory 228. In an embodiment, the proximity detector 224 and the communication device 226 can be combined in a single component without changing the scope of the disclosure. The chipset 222 of the wearable device 220 is in communication with the proximity detector 224, the communication device 226, and the memory 228. In an embodiment the communication devices 206, 216, and 226 may be configured to communicate via a wireless communication protocol, such as Bluetooth, Bluetooth low energy (BLE), or the like.

In an embodiment, both the personal computer 200 and the tablet computer 210 can be configured as master devices, and the wearable device 220 can be configured as a slave device. The chipset 222 of the wearable device may be configured to connect with a specific number of master devices. For example, the chipset 222 of the wearable device 220 may be able to connect only to one master device at a time, may be able to connect to two master devices at a time, may be able to connect to four master devices at a time, or the like. In an non-limiting embodiment described herein, the wearable device 220 can be a slave to both the personal computer 200 and the tablet computer 210, but the chipset 222 can only connect to one of the personal computer 200 or the tablet computer 210 at the same time.

The wearable device 220 can be placed within a threshold distance 230 of the personal computer 200 and can be detected by both the proximity detector 204 and the communication device 206 of the personal computer 200. Similarly, the wearable device 220 can also be placed within a threshold distance 240 of the tablet computer 210 and can be detected by both the proximity detector 214 and the communication device 216 of the tablet computer 210. In an embodiment, the threshold distances 230 and 240 can be defined based on a threshold path loss of signal strength of the wearable device 220. For example, the proximity detector 204 can calculate the distance between the personal computer 200 and the wearable device 220 based on a transmit power of the signal from the wearable device and a received power at the personal computer. In an embodiment, the proximity detector 204 can utilize equation 1 below to determine the distance between the personal computer 200 and the wearable device 220:

$$Pr=Pt*\lambda^2/(4*\pi*d)^2 \qquad (EQ.\ 1)$$

In equation 1 above, Pr is the received power, Pt is the transmit power, λ is the wavelength of the transmit/received frequency, and d is the distance between the personal computer 200 and the wearable device 220. However, even though the wearable device is within proximity to both the personal computer 200 and the tablet computer 210, the personal computer 200 and the tablet computer 210 do not initiate a connection with the wearable device 220 until an input is received from an individual. In this situation, the information handling system, personal computer 200 or tablet computer 210, which receives the user input and initiates a connection with the wearable device 220. For example, when the personal computer 200 receives a user input or trigger, the chipset 202 utilizes the communication device 206 to connect with the wearable device 220 and to request authentication information from the wearable device 220. In an embodiment, the user input or trigger can be moving of a pointing device, pressing a key on a keyboard, or the like. While the wearable device 220 is connected to the personal computer 200, the wearable device 220 ignores connection requests from other master devices, such as tablet computer 210. In response to receiving the request at the communication device 226, the chipset 222 of the wearable device 220 retrieves an authentication token from the memory 228 and provides the authentication token to the personal computer 200.

The chipset 202 of the personal computer 200 can compare the authentication token to one or more authentication tokens stored in memory 208, and if the authentication token from the wearable device 220 matches one of the authentication tokens stored in memory 208 the chipset 202 can authenticate wearable device 220 as a slave device of the personal computer 200 and can connect with the wearable device 220 via a wireless communication link. In an embodiment, the wearable device 220 can add the personal computer to a master list 224, which includes the master devices that the wearable device 220 has been authenticated. The personal computer 200 can then retrieve the transmission power setting of the wearable device 220 and can store the transmission power setting in the memory 208. The authentication of the wearable device 220 can enable the chipset 202 to unlock the personal computer 200 for use by the individual. The chipset 202 can then disconnect from the wearable device 220, such that the personal computer 200 and the wearable device 220 are no longer actively communicating with one another.

After disconnecting from the wearable device 220, the chipset 202 can provide a signal to the proximity detector 204 to cause the proximity detector 204 to continue to monitor a received signal strength indicator (RSSI) associated with the wearable device 220 without being in active communication with the wearable device. The proximity detector 204 can then continually calculate path loss of the signal strength for the wearable device 220 based on the transmission power setting and a most recent RSSI of the wearable device 220.

When the personal computer 200 disconnects from the wearable device 220, the wearable device 220 can connect to any other master device, such as tablet computer 210, that the wearable device 220 is in proximity with. When the tablet computer 210 receives a user input or trigger, the chipset 212 utilizes the communication device 216 to connect with the wearable device 220 and to request authentication information from the wearable device 220. In response to receiving the request at the communication device 226, the chipset 222 of the wearable device 220 retrieves an authentication token from the memory 228 and provides the authentication token to the tablet computer 210.

The chipset 212 of the tablet computer 210 can compare the authentication token to one or more authentication tokens stored in memory 218, and if the authentication token from the wearable device 220 matches one of the authentication tokens stored in memory 218 the chipset 212 can authenticate wearable device 220 as a slave device of the tablet computer 210 and can connect with the wearable device 220 via a wireless communication link. In an embodiment, the wearable device 220 can then add the tablet computer 210 to the master list 224. The tablet computer 210 can then retrieve the transmission power setting of the wearable device 220 and can store the transmission power setting in the memory 218. In an embodiment, the authentication of the wearable device 220 can enable the chipset 212 to unlock the tablet computer 210 for use by the individual. The chipset 212 can then disconnect from the wearable device 220, such that the tablet computer 210 and the wearable device 220 are no longer actively communicating with one another.

After disconnecting from the wearable device 220, the chipset 212 can provide a signal to the proximity detector 214 to cause the proximity detector 214 to continue to monitor a RSSI associated with the wearable device 220 without being in active communication with the wearable device. The proximity detector 214 can then continually calculate path loss of the signal strength for the wearable device 220 based on the transmission power setting and a most recent RSSI of the wearable device 220.

Thus, after the initial communication and authentication of the wearable device 220, the proximity detectors 204 and 214 can both monitor the RSSI of the wearable device 220 to determine whether the wearable device is within proximity of the respective personal computer 200 or the tablet computer 210. While the wearable device 220 is not actively connected to one of the master devices, such as personal computer 200 or tablet computer 210, the wearable device 220 can utilize the master list 224 to actively listen for a communication signal from the master devices on a one by one rotation through the master list 224. In an embodiment, the wearable device 220 can actively listen for each device for a short period of time before moving to the next device in the master list 224.

The operations of the proximity detectors 204 and 214 can be substantially similar. Thus, for clarity and brevity, this operation will be discussed only with respect to proximity detector 204 of personal computer 200. As stated above, the proximity detector 204 can continually calculate path loss of the signal strength for the wearable device 220 based on the transmission power setting and a most recent RSSI of the wearable device 220. If the path loss associated with the wearable device 220 drops below a threshold value, the proximity detector 204 can determine that the wearable device 220 has left the threshold distance 230. The chipset 202 can then lock the personal computer 200 in response to the proximity detector 204 determining that the wearable device 220 has left the threshold distance 230. Once the wearable device 220 leaves the proximity, such as threshold distance 230, of the personal computer 200, the wearable device 220 should be re-authenticated next time the wearable device is within proximity of the personal computer 200.

Figure 3:
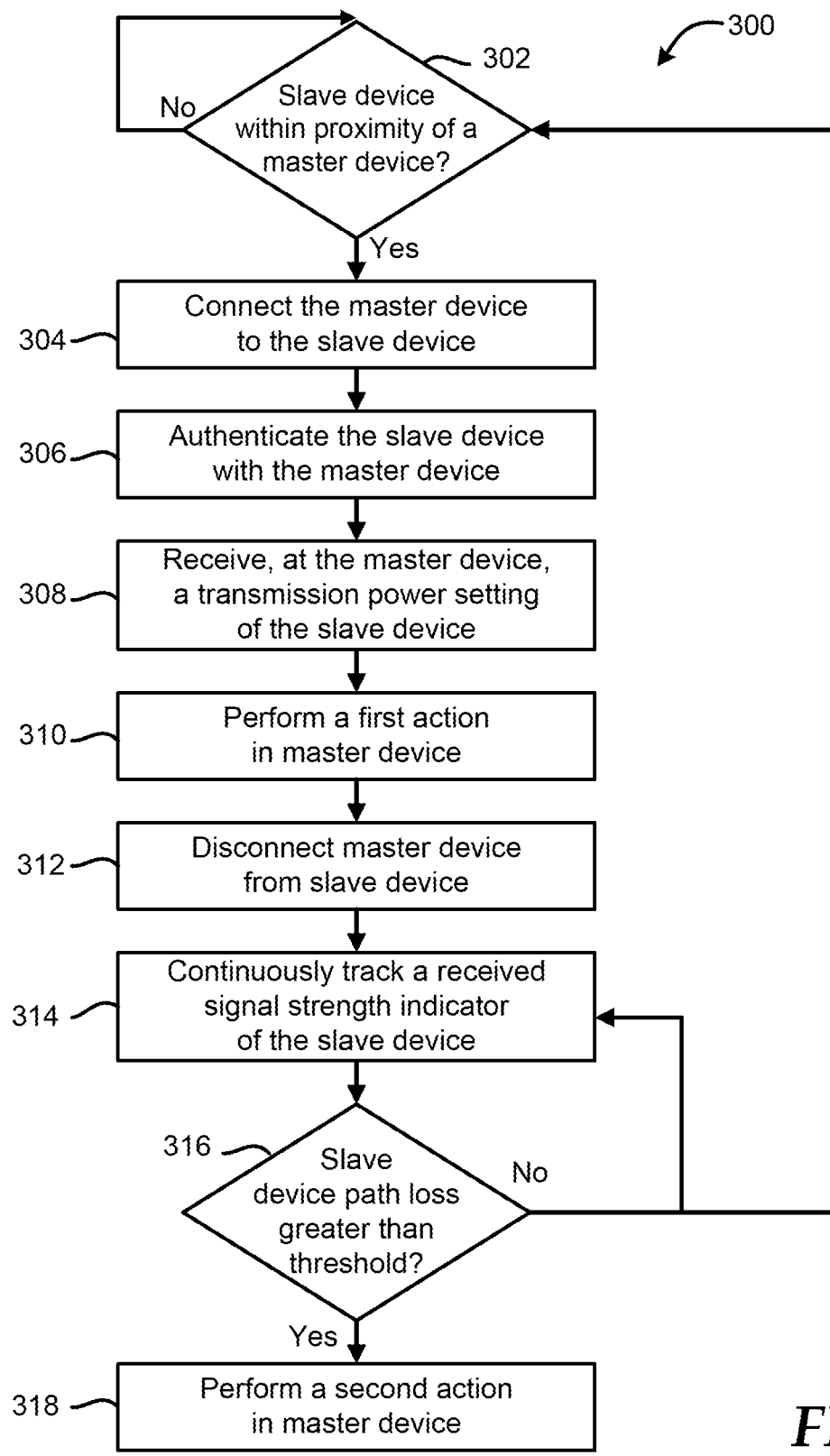
FIG. 3 illustrates a method for communicating between a slave device and at least one more master device than allowed by a chipset of the slave device according to at least one embodiment of the present disclosure.

FIG. 3 illustrates a method 300 for communicating between a slave device and at least one more master device than allowed by a chipset of the slave device according to at least one embodiment of the present disclosure. At block 302, a determination is made whether the slave is within proximity of a master device. In an embodiment, the slave device can be any type of information handling system, such as a watch, bracelet, or any type of wearable information handling system. In an embodiment, the slave device is enabled to communicate with one or more masters via Bluetooth low energy (BLE). In an embodiment, the slave device may be in proximity to multiple master devices. In response to the slave device being in proximity to a master device, the flow continues as block 304, and the master device connects with the slave device.

At block 306, the salve device is authenticated with the master device. In an embodiment, the authentication is in response to the slave device providing a proper authorization token to the master device. The master device receives the power setting of the slave device at block 308. In an embodiment, the power setting of the slave device can be stored in a memory of the master device. At block 310, a first action is performed in the master device. In an embodiment, the action performed is that the master unlocks itself, or the like. The master disconnects from the slave device at block 312. At block 314, the received signal strength indicator (RSSI) of the slave device is continuously tracked by the master device. In an embodiment, the master device can track the RSSI of the slave device without the master device being connected to the slave device.

At block 316, a determination is made whether the slave device path loss is greater than a threshold value. In an embodiment, the slave device can be determined to be outside a threshold distance from the master device in response to the path loss being greater than the threshold. If the path loss is less than the threshold, the flow continues as described above at block 314. Additionally, in response to the path loss being less than the threshold, the flow continues as described above at block 302. In this situation, a determination is made whether the slave device is in proximity with another master device other master device other than the master device that the slave device was connected. If the slave device is in proximity to another master device the flow continues for the slave device and the master device as described above at blocks 304-314. If the path loss is greater than the threshold, the flow proceeds to block 318 and a second action is performed in the master device. In an embodiment, this action can be the master device locking, such as displaying a lock screen on the master device.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
   a slave device;
   a first master device configured to communicate with the slave device, to detect that the slave device is within proximity of the first master device, to authenticate the slave device and to get unlocked in response to the authentication, to receive a transmission power setting of the slave device, to disconnect from the slave device, and to continuously track a received signal strength indicator (RSSI) of the slave device while the first master device is disconnected from the slave device; and
   a second master device configured to communicate with the slave device to detect that the slave device is within proximity of the second master device, to authenticate the slave device and to get unlocked in response to the authentication, to receive the transmission power setting of the slave device, to disconnect from the slave device, and to continuously track the RSSI of the slave device while the second master device is disconnected from the slave device;
   wherein the proximity is based upon the received transmission power setting and a most recently tracked RSSI, wherein each of the first master device and the second master devices is locked when the proximity is beyond a threshold distance.

2. The system of claim 1, wherein the slave device is configured to create a list of master devices that have connected with the slave device, and to actively monitor for a communication from one of the first and second master devices in the list of master device on a one by one rotation through the list of master devices.

3. The system of claim 1, wherein the first master device is further configured to calculate a slave device path loss based on the RSSI and the transmission power setting, and to perform the locking in the first master device in response to the path loss being above a threshold value.

4. The system of claim 3, wherein the first master device is further configured to determine that the slave device has left proximity of the first master device in response to the path loss being above the threshold value.

5. The system of claim 4, wherein the slave device has to be re-authenticated in response to the path loss being above the threshold value.

6. The system of claim 1, wherein the threshold distance includes a threshold path loss of the RSSI of the slave device.

7. A method comprising:
   detecting that a slave device is within proximity of a first master device;
   authenticating the slave device, wherein the first master device is unlocked in response to the authentication;
   receiving a transmission power setting of the slave device;
   continuously tracking, at the first master device, a received signal strength indicator (RSSI) of the slave device while the first master device is disconnected from the slave device;
   detecting that the slave device is within proximity of a second master device;
   authenticating the slave device, wherein the second master device is unlocked in response to the authentication;
   receiving the transmission power setting of the slave device; and
   continuously tracking, at the second master device, the RSSI of the slave device while the second master is disconnected from the slave device;
   wherein the proximity is based upon the received transmission power setting and a most recently tracked RSSI, wherein each of the first master device and the second master devices is locked when the proximity is beyond a threshold distance.

8. The method of claim 7, further comprising: creating a list of master devices that have connected with the slave device, and to actively monitor for a communication from one of the first and second master devices in the list of master device on a one by one rotation through the list of master devices.

9. The method of claim 8,
   wherein the list of master devices includes the authenticated master devices.

10. The method of claim 7, further comprising:
    determining that the slave device has left proximity of the first master device in response to a path loss being above a threshold value.

11. The method of claim 10, wherein the slave device has to be re-authenticated in response to leaving proximity to the first master device.

12. The method of claim 10,
    wherein the threshold distance includes the path loss of the RSSI of the slave device.

13. The method of claim 7, wherein the detecting is triggered by a user input.

14. A non-transitory computer readable medium when executed by a processor to cause the processor to implement a method, the method comprising:
    detecting that a slave device is within a threshold distance of a first master device;
    authenticating the slave device, wherein the first master device gets unlocked in response to the authentication;
    continuously tracking, at the first master device, a received signal strength indicator (RSSI) of the slave device while the first master device is disconnected from the slave device;
    detecting that the slave device is within the threshold distance of a second master device;
    authenticating the slave device, wherein the second master device gets unlocked in response to the authentication;
    receiving the transmission power setting of the slave device; and
    continuously tracking, at the second master device, the RSSI of the slave device while second master is disconnected from the slave device;
    wherein the proximity is based upon the received transmission power setting and a most recently tracked RSSI, wherein each of the first master device and the second master devices is locked when the proximity is beyond the threshold distance.

15. The non-transitory computer readable medium of claim 14, wherein the threshold distance includes a threshold path loss of the RSSI of the slave device.

16. The non-transitory computer readable medium of claim 14, the method further comprising:
calculating a slave device path loss based on the RSSI and the transmission power setting; and
performing a second action in the first master device in response to the path loss being above a threshold value.

17. The non-transitory computer readable medium of claim 16, wherein the slave device has to be re-authenticated in response to leaving proximity to the first master device.

18. The non-transitory computer readable medium of claim 16,
wherein the second action includes locking of the first master device.

19. The non-transitory computer readable medium of claim 14, further comprising: creating a list of master devices that have connected with the slave device, and to actively monitor for a communication from one of the first and second master devices in the list of master device on a one by one rotation through the list of master devices.

\* \* \* \* \*